United States Patent Office 3,629,195
Patented Dec. 21, 1971

3,629,195
ANACARDIC ACID REACTED WITH TRIS (HYDROXYETHYL) ISOCYANURATE
Manuel A. Jordan, Schenectady, and Kenneth C. Petersen, Scotia, N.Y., assignors to Schenectady Chemicals, Inc., Schenectady, N.Y.
No Drawing. Filed Sept. 17, 1969, Ser. No. 858,842
Int. Cl. C08g 5/12
U.S. Cl. 260—46    14 Claims

ABSTRACT OF THE DISCLOSURE

Anacardic acid, preferably in the form of cashew nut shell liquid, is reacted with tris (hydroxyethyl) isocyanurate. The product is useful as a brake lining binder or can be reacted with an aldehyde to form friction modifier particles.

---

The present invention relates to anacardic acid esters.

It is an object of the present invention to prepare novel esters of anacardic acid.

Another object is to prepare improved brake linings.

An additional object is to prepare improved friction modifier particles.

A further object is to provide novel phenolaldehyde resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting tris (hydroxyethyl) isocyanurate (commonly abbreviated THEIC) with anacardic acid. The product can be used as such as a brake lining binder, for example, or can be reacted further with a cross-linking agent such as an aldehyde, e.g., formaldehyde, trioxane, furfural and benzaldehyde or hexamethylene tetramine.

The anacardic acid can be used as such, but is preferably employed in the form of cashew nut shell liquid (CNSL) which contains about 90% of anacardic acid, e.g., see Kremens Patent 2,431,127 or Jour. Org. Chem. vol. 14, pages 670 and 849 (1949).

In the reaction of the tris (hydroxyethyl) isocyanurate with the cashew nut shell liquid there can be used an excess of the CNSL. The reaction is generally carried out at least until there is an average reaction corresponding to the monoester of CNSL with THEIC although reaction can be continued until there is formed diester and even triester (THEIC having three alcoholic hydroxyl groups). The reaction with the CNSL apparently occurs on the carboxylic group thereof. In the reaction the CNSL also partially polymerizes in addition to reacting with the THEIC. The THEIC also reacts with such partial polymers and hence a quite complex product results.

The reaction is normally stopped prior to gelation due to polymerization and cross-linking. However, the gelled product can be used as friction dust in a manner analogous to gelled CNSL.

For most purposes where gelation is not desired, it has been found satisfactory to stop the reaction at about 60% of completion. There is relatively no free THEIC at this point. The CNSL can be used in an amount of 1, 2, 3 moles or more (calculated as anacardic acid) per mole of THEIC. The CNSL can be as much as 6 moles or more, e.g., 10 moles per mole of THEIC.

As is conventional in CNSL polymerization and also in esterification reactions, the reaction is hastened by the use of a small amount of a catalyst, e.g., an acid catalyst or Friedel-Crafts catalyst, e.g., 0.1 to 10% of catalyst based on the total reactants. Suitable catalysts include sulfuric acid, dimethyl sulfate, toluene sulfonic acid, benzene sulfonic acid, phosphoric acid, trichloroacetic acid, oxalic acid, boron trifluoride, aluminum chloride, diethyl sulfate, hydrobromic acid, etc.

The THEIC–CNSL (or THEIC-anacardic acid) ester is useful in insulating varnishes, e.g., in combination with alkylphenol-aldehyde novolacs and resoles such as those from p-t-octylphenol-formaldehyde, for example, and in preparing heat resistant laminates of paper, organic fabrics, glass fibers and other inorganic fibers.

The THEIC–CNSL is useful as such in making brake lining binders, grinding wheel binders, etc. For such use there is usually added hexamethylene tetramine as a curing agent, as is conventional with CNSL friction materials.

The CNSL-THEIC reaction products have the advantage over conventional CNSL products by improved heat resistance, particularly in friction heat, improved wear (both in brake linings and as a grinding wheel binder).

The CNSL–THEIC ester-polymerized ester mixture as stated can be reacted with aldehydes such as formaldehyde (either as such or as paraformaldehyde or trioxane, for example), furfural, benzaldehyde, acetaldehyde, glyoxal, etc. Mixtures of aldehydes can be used, e.g., an equimolar mixture of formaldehyde and furfural. The products can be used in all kinds of friction elements such as grinding wheels, polishing bands, brake linings, clutch linings, belting, pulley facings, tire treads. Thus, brake bands can be made by dipping bands of woven cotton, asbestos or other fabric in a syrupy CNSL-THEIC-formaldehyde and then curing.

The CNSL-THEIC-formaldehyde resin can also be mixed with conventional friction materials including ground rubber, butadiene-styrene rubber, chrysolite or anthosphyllite asbestos, silica, alumina, barytes, iron oxide, lead oxide, zinc oxide, marble, Carborundum, slate dust, brass chips, metal particles, graphite, sulfur. Thus, the products can be used in place of the CNSL in the formulations of Harvey patent 2,165,140, the entire disclosure of which is hereby incorporated by reference.

In reacting the CNSL-THEIC product with an aldehyde, e.g., formaldehyde, there can be used 0.1 mole, 0.3 mole, 0.5 mole, 1 mole or even 1.5 mole of aldehyde per mole of CNSL. The same acids can be used as set forth supra to make quasi novolac resins. If resole type resins are desired, then alkaline catalysts can be used such as ammonia, morpholine, lutidines, sodium hydroxide and potassium hydroxide. The temperature of reaction is not critical and, as is customary in the art, can range from room temperature to 250° C., for example.

Unless otherwise indicated, all parts and percentages are by weight.

EXAMPLE 1

1212 grams of cashew nut shell liquid, 262 grams of tris (2-hydroxyethyl) isocyanurate, and 7.5 grams of p-toluene sulfonic acid were loaded into a flask set up for azeotropic distillation. The batch was azeotropically distilled until 60% of the theoretical water (based on the THEIC) was removed. The material was then cooled to room temperature yielding a viscous semi solid product which could be packaged and sold as such or could be reacted further, as shown hereinafter.

EXAMPLE 2

The product of Example 1 was brought to 100° C. and 97 grams of a 47.5% solution of formaldehyde in methanol was added. The temperature was again brought to 100° C. in an oven and was then raised to 200° C. and maintained for 8 hours yielding 1300 grams of a gelled product which was ground to a powder in a mill.

EXAMPLE 3

Another sample of the product of Example 1 was incorporated in the following formulation and tested as a brake lining binder on a "FAST" machine (friction assessment standard testing machine made by Bush Manufacturing Co.).

| | Grams |
|---|---|
| (A) Asbestos | 50 |
| (B) Barytes | 30 |
| (C) Hexamethylene tetramine | 2.2 |
| (D) Product of Example 1 | 22 |
| (E) Xylene | 25 |

Ingredients A, B and C were intimately mixed. Then a mixture of D and E was added and the total was mixed for complete coating, and dried at 100° C. for two hours. The mixture was then pressed into a bar at 350° F. (177° C.) for 20 minutes.

The bar was then post cured and tested on a FAST machine with the following results:

(1) Very stable friction (coefficient of friction equals approximately 0.52 at a temperature of 460–810° F. (238–432° C.)
(2) No fade.
(3) Hardness (R scale) equals 84.
(4) Percent extractable (acetone) equals 0.15%.
(5) Wear equals 34.2%.

EXAMPLE 4

The gelled particles of Example 2 were incorporated into the below asbestos disc pad mix at the 14% level and press cured to form a bar. The disc pad formulation was:

| | Grams |
|---|---|
| Asbestos 6D (Johns-Manville) | 40.19 |
| SP-8855 phenol-formaldehyde novolak (Schenectady Chemicals, Inc.) | 12.96 |
| Hard Rubber Dust (Firestone) | 12.45 |
| Friction particles | 14.00 |
| Super Jet Lamp Black M1011 Carbon Black (C. K. Williams Corp.) | 1.23 |
| Barium sulfate | 18.37 |
| Lime, CaO | 0.80 |

A section of the bar was then subjected to evaluation on a FAST machine. The tests indicated that the product of Example 2 improved the "cold friction" and shifted the beginning of the fade towards high temperatures as compared with the commercial control (made from CNSL-formaldehyde).

| Type of particle | Sp. gr. (g./cc.) | Hardness | Percent wear | Fade temp., ° F. | Coef. 0–550, ° F. | Level 550–810,° F. |
|---|---|---|---|---|---|---|
| Commercial | 1.72 | 88 | 33.4 | 490 | 0.37–0.48 | 0.48–0.28 |
| Product of Example 2 | 1.69 | 85 | 34.3 | 600 | 0.35–0.48 | 0.48–0.29 |

EXAMPLE 5

500 grams of the product of Example 1 was brought to 100° C. and 100 grams of furfural was added. The mixture was placed in an oven at 200° C. and maintained for 24 hours yielding 445 grams of a gelled product which was ground to a powder in a mill.

EXAMPLE 6

500 grams of the product of Example 1 was brought to 100° C. and 111 grams of benzaldehyde was added. The mixture was placed in an oven at 200° C. and maintained for 24 hours yielding 460 grams of a gelled product which was ground to a powder in a mill.

EXAMPLE 7

500 grams of the product of Example 1 was brought to 100° C. and 24 grams of hexamethylene tetramine was added. The mixture was placed in an oven at 200° C. and maintained for 24 hours yielding 456 grams of a gelled product which was ground to a powder in a mill.

EXAMPLE 8

500 grams of the product of Example 1 was brought to 100° C. and a mixture of 50 grams of furfural and 17 grams of paraformaldehyde was added. The mixture was placed in an oven at 200° C. and maintained for 24 hours yielding 465 grams of a gelled product which was ground to a powder in a mill.

EXAMPLE 9

500 grams of the product of Example 1 was brought to 100° C. and 67 grams of a 47.5% solution of formaldehyde in methanol was added. The mixture was placed in an oven at 200° C. and maintained for 12 hours yielding 455 grams of a gelled product which was ground to a powder in a mill.

The products of Examples 5–9 can be used in the formulation of Example 4 in place of the product of Example 2.

EXAMPLE 10

2424 grams of cashew nut shell liquid, 524 grams of tris (2-hydroxyethyl) isocyanurate, and 15 grams of p-toluene sulfonic acid were loaded into a flask set up for azeotropic distillation. When 46% of the theoretical water (based on the THEIC) was removed by azeotropic distillation the distillation was stopped. The material was let to cool to room temperature and allowed to set overnight. Seventeen hours later the azeotropic distillation was continued until 55% of the theoretical water (based on THEIC) was removed. At this point the batch gelled.

EXAMPLE 11

(2.5 moles) 1010 grams of cashew nut shell liquid, 655 grams (2.5 moles) of tris (2-hydroxyethyl) isocyanurate, and 8.3 grams of p-toluene sulfonic acid were loaded into a flask set up for azeotropic distillation. The batch was azeotropically distilled until the theoretical amount of water was removed. The material was then cooled to room temperature, yielding a viscous semi solid product.

These products can be used to react with aldehydes or can be used per se for friction uses.

What is claimed is:

1. An organic esterification reaction product selected from the group consisting of (1) the reaction product of tris (2-hydroxyethyl) isocyanurate and a source of anacardic acid and (2) the reaction product of (1) and an aldehyde source.

2. Reaction product (1) of claim 1 wherein the source of anacardic acid is cashew nut shell liquid.

3. The reaction product of claim 2 wherein the cashew nut shell liquid is used in excess and the reaction is continued until essentially no free tris (2-hydroxyethyl) isocyanurate is present, but the reaction is stopped before gellation.

4. The reaction product according to claim 2 wherein the cashew nut shell liquid is used in excess and the reaction is stopped when 33⅓ to not over 68% of available hydroxy groups on the tris (2-hydroxyethyl) isocyanurate are reacted.

5. The reaction product of claim 4 wherein the reaction is stopped when not over 60% of said hydroxyl groups are reacted.

6. Reaction product according to claim 1 from 1 mole of tris (2-hydroxyethyl) isocyanurate with 10 to 1 moles of cashew nut shell liquid.

7. Reaction product (2) of claim 1 wherein the source of anacardic acid is cashew nut shell liquid.

8. Reaction product according to claim 7 wherein the aldehyde is formaldehyde.

9. Reaction product of claim 7 wherein the esterification reaction is stopped prior to gelation and when 33⅓ to not over 68% of the available hydroxyl groups of the tris (2-hydroxyethyl) isocyanurate are reacted.

10. Reaction product according to claim 9 wherein the aldehyde source is selected from the group consisting of formaldehyde, paraformaldehyde, trioxane, hexamethylene tetramine, furfural, benzaldehyde or mixtures thereof, and is used in an amount of 0.10 to 1.5 moles per mole of cashew nut shell liquid.

11. Reaction product according to claim 10 wherein the aldehyde source is formaldehyde.

12. A friction element containing friction material and including the product of claim 1.

13. A friction element according to claim 12 wherein said product is present as a friction modifier particle.

14. A friction element according to claim 12 wherein said product is present as a binder.

References Cited

UNITED STATES PATENTS

| | | | |
|---|---|---|---|
| 2,165,140 | 7/1939 | Harvey | 260—46 X |
| 2,431,127 | 11/1947 | Kremers | 260—46 UX |
| 2,618,618 | 11/1952 | Rosamilia | 260—46 X |
| 3,088,948 | 5/1963 | Little et al. | 260—248 |
| 3,378,530 | 4/1968 | Little | 260—67.6 |
| 3,410,854 | 11/1968 | MacGregor et al. | 260—248 |

HOWARD E. SCHAIN, Primary Examiner

U.S. Cl. X.R.

106—36; 260—3, 37 M, 37 N, 887